(12) United States Patent
Wietkamp

(10) Patent No.: US 9,725,050 B2
(45) Date of Patent: Aug. 8, 2017

(54) IMAGE CAPTURING SYSTEM WITH FLEXIBLE TRANSFER ELEMENT

(71) Applicant: HUF HULSBECK & FURST GMBH & CO. KG, Velbert (DE)

(72) Inventor: Stephan Wietkamp, Munster (DE)

(73) Assignee: HUF HULSBECK & FURST GMBH & CO. KG., Velbert (DE)

(*) Notice: Subject to any disclaimer, the term of this patent is extended or adjusted under 35 U.S.C. 154(b) by 0 days.

(21) Appl. No.: 14/988,106

(22) Filed: Jan. 5, 2016

(65) Prior Publication Data
US 2016/0193972 A1 Jul. 7, 2016

(30) Foreign Application Priority Data
Jan. 5, 2015 (DE) .................. 10 2012 100 038

(51) Int. Cl.
*H04N 5/225* (2006.01)
*B60R 11/04* (2006.01)
*H04N 5/232* (2006.01)
*B60R 11/00* (2006.01)

(52) U.S. Cl.
CPC ........... *B60R 11/04* (2013.01); *H04N 5/2252* (2013.01); *H04N 5/2254* (2013.01); *H04N 5/23216* (2013.01); *B60R 2011/004* (2013.01); *B60R 2011/0094* (2013.01)

(58) Field of Classification Search
USPC ........................................................ 348/373
See application file for complete search history.

(56) References Cited

U.S. PATENT DOCUMENTS

| | | | | |
|---|---|---|---|---|
| 6,009,189 A | * | 12/1999 | Schaack | A61B 1/00147 348/137 |
| 2012/0293656 A1 | * | 11/2012 | Schutz | B60R 11/04 348/148 |
| 2013/0016219 A1 | * | 1/2013 | Hahner | B60R 11/04 348/148 |
| 2013/0209079 A1 | * | 8/2013 | Alexander | B60R 11/04 396/25 |
| 2013/0235204 A1 | * | 9/2013 | Buschmann | B60R 11/04 348/148 |
| 2014/0197649 A1 | * | 7/2014 | Hansen | B60R 11/04 292/336.3 |

FOREIGN PATENT DOCUMENTS

KR 20130045122 A * 5/2013

* cited by examiner

*Primary Examiner* — Anthony J Daniels
(74) *Attorney, Agent, or Firm* — Porzio Bromberg & Newman P.C.

(57) ABSTRACT

The invention relates to an image capturing system with a camera unit for capturing images of the outside area of a motor vehicle, and with a protective element, wherein at least the camera unit and/or the protective element can be moved via a mechanism by means of a drive from at least a closed position (Ia) into at least an open position (IIa), wherein in the closed position (Ia) of the protective element at least one lens of the camera unit is located behind the protective element so as to be inaccessible from the outside, and in the open position (IIa) at least the lens of the camera unit is exposed for image capture by the protective element. It is essential to the invention that at least the deflecting element is arranged on the mechanism, the deflecting element serving to change the direction of force applied to the mechanism, thus allowing a compact installation space to be realized.

17 Claims, 4 Drawing Sheets

A - A

A - A

IMAGE CAPTURING SYSTEM WITH FLEXIBLE TRANSFER ELEMENT

BACKGROUND OF THE INVENTION

Field of the Invention

The present invention relates to an image capturing system with a camera unit, for capturing images of the outside area of a motor vehicle according to the preamble of claim 1. The image capturing system is equipped with a camera unit for capturing images of the outside area of the motor vehicle and a protective element, wherein at least the camera unit and/or the protective element can be moved via a mechanism by means of a drive from at least a closed position into at least an open position, wherein in the closed position of the protective element at least one lens of the camera unit is located behind the protective element so as to be inaccessible from outside, and in the open position at least the lens of the camera unit is exposed by the protective element for capturing images.

Description of Related Art

It is known that state-of-the-art image capturing systems are equipped with a camera unit, which can be moved via a drive from a closed position to an open position and vice-versa. Moreover the DE 20 2013 105 314 U1 has disclosed a motor vehicle lock comprising a locking mechanism, in which a drive and a flexible cable pull means is used to achieve the corresponding operating states.

The disadvantage with image capturing systems of the kind mentioned above consists in that the image capturing system, for installation in a motor vehicle, must provide sufficient installation space, so that the drive for the camera unit can be positioned in such a way that force transfer from the drive to the camera unit can be established via a rigid transfer element. Such systems are very rigid as regards their use on a respective vehicle. It is thus not possible to adapt them to suit different vehicle and installation situations.

SUMMARY OF THE INVENTION

It is the requirement of the present invention to at least partially eliminate the above described disadvantages. In particular, it is the requirement of the invention to arrange the drive of the camera unit in a spatially flexible manner in relation to the camera unit so that the drive can be arranged inside a housing of the image capturing systems or even outside it.

This requirement is met by an image capturing system with the characteristics of claim 1. Further features and details of the invention are revealed in the sub-claims, the description and the drawings.

According to the invention the image capturing system with a camera unit for capturing images of the outside area of a motor vehicle comprises at least one protective element, wherein at least the camera unit and/or the protective element can be moved via a mechanism by means of a drive from at least a closed position to at least an open position, wherein in the closed position of the protective element at least one lens of the camera unit is located behind the protective element so as to be inaccessible from outside, and in the open position at least the lens of the camera unit is exposed for image capture by the protective element. Further at least one deflecting element is arranged on the mechanism, which serves to change the direction of the force behind the mechanism, thereby realising a compact installation space. This results in the advantage that the drive can be arranged in a spatially flexible manner in relation to the camera unit. In this respect it is conceivable that the drive can be arranged within the housing of the camera unit or even outside a housing of the camera unit and can thus be arranged in a random location on the vehicle. This is realised by the mechanical connection between the drive and the camera unit, the connection transferring the force to be transferred via the deflecting element, even for a change in direction. Due to having a common mechanism for the camera unit and the protective element, the protective element does not have to be set in motion by the camera itself, thereby reducing mechanical loads on the components involved. In addition it is also feasible that the protective element is mounted in such a way that this can be opened and closed independently of the camera unit, without the camera being brought into the closed or open position. This makes it possible for at least a lens of the camera unit to be easily accessible from outside. The protective element can be moved from the open position into the closed position and vice versa via a translational and/or rotational movement. To this end the protective element can be acted upon by a return spring in order to bring the protective element on its own into the closed position.

A crucial core idea of the present invention is the flexible spatial arrangement of the drive for the camera unit within the vehicle, whereby the variability in designing the installation space and the required installation space are optimised, because force transfer can be changed with respect to its direction by the deflecting element, so that the drive can be arranged at a distinctive distance or in a place (on the vehicle), which is difficult to access. The realised change in direction of the applied force makes it possible to even arrange the drive at an angle offset from the camera unit.

A particular advantage is achieved in that the deflecting element is a deflecting roller, in particular in that the deflecting roller is movably mounted and can be rotated about a rotational axis. A deflecting roller according to the invention may be a full-circle- or partial-circle-shaped roller which is mounted so as to be movable about a rotational axis. An at least partial-circle-shaped deflecting roller or full-circle-shaped deflecting roller promotes a low-friction and thus low-wear transfer of force, wherein, in particular with a rotatably mounted deflecting roller, the force losses due to friction are distinctly less. The deflecting roller may be configured as a solid or hollow cylinder wherein the cylinder jacket is connected to the rotational axis/the mounting. In addition a hollow cylinder may comprise reinforcement ribs which can absorb any occurring mechanical loads. It is also feasible for the deflecting roller to comprise at least one web on its rim surface, so that a gradient results along the running surface. Advantageously the deflecting roller has a second web along the running surface so that a curved U-shaped running surface is created between the two webs.

An essential feature of the deflecting roller according to the invention is characterised in that it serves as a kind of force transducer mounted in a low-friction manner on an axis and causes a change in direction of the force vector without changing the force amount. It is also feasible for the deflecting element/the deflecting roller to be mounted eccentrically in relation to its rotational axis, thereby widening the scope of influencing the force ratio for adjustment even further.

In terms of the invention it is feasible for the camera unit to be steplessly movable between the open position and the closed position via a camera carriage. The advantage of this is that when installed the image capturing system can finish flush with the car body without the camera protruding from the image capturing system. As a result protection against environmental influences, vandalism and theft is distinctly increased because the camera unit can be recessed in a part of the bodywork of the car. Moving the camera unit by means of a camera carriage according to the invention makes it possible to change the position of the camera unit from an inactive position into an image-capturing position, wherein the at least one lens for capturing images of the outside of the motor vehicle is exposed. Advantageously the camera on the camera carriage can be connected via at least one joint or joint mechanism/guiding mechanism, thereby allowing the camera unit to be moved not only horizontally but also vertically or by a combined movement.

Furthermore it is feasible for at least one transfer element to be arranged with its one end on the camera carriage and/or the protective element, in particular in that the transfer element with its one end is attached to the camera carriage and/or the protective element, in particular to a connecting element of the camera carriage and/or the protective element. The transfer means serves to transfer the force from the drive via the deflecting element to the camera carriage/the protective element, so that the camera carriage/the protective element can be moved from a closed position into at least an open position or from an inactive position into a recording position. Accordingly the one end of the transfer element is attached to the drive and the other end of the transfer element is attached to the camera carriage and/or the protective element. It is especially preferred if the transfer element is attached, with its one end to a connecting element of the camera carriage and/or the protective element, wherein the connecting element may be configured in one piece with the camera carriage/the protective element. The connection between the connecting element and the camera carriage/the protective element may be a hook connection, an adhesive connection, a screw connection, a clamping connection or may be accomplished by moulding. A hook connection, a screw connection or a clamping connection has the advantage that it can be reversed and be replaced in case of a defect. Moulding the transfer element or gluing it represents a durable connection technique protected against environmental influences. Moreover connections of this kind do not require any further components which would lead to further costs and wear.

Advantageously the transfer element is configured in a flexible manner, in particular as a flexible cable pull means. A flexible transfer element is understood to mean a rope, a wire, a chain, a belt, a ribbon or an articulated rod. It is, however, particularly advantageous if the transfer element is a flexible cable pull means, which can be arranged in a flexible and convenient manner with respect to the installation space. A Bowden cable, for example, would be suitable, which apart from almost loss-free force transfer is also highly wear-resistant. Such a Bowden cable normally consists of a metal wire or a wire rope allowing forces to be transferred also along bends.

According to the invention it is also feasible for the cable pull system to be a sealed cable pull system, in particular in that it comprises at least one encapsulated cable pull envelope, at least one flexible cable pull means, in particular with a coating with gliding properties, such as a PTFE, (PTFE polytetrafluorethene) or a graphite coating, at least one stop sleeve as well as at least one liner in which a flexible cable pull means can be arranged. The cable pull envelope acts as a mechanical guide for the flexible cable pull means and as a counter-bearing for the pulling forces transferred, thus allowing the flexible cable pull means to transfer pulling forces also along bends. The slippery coating of the flexible cable pull means reduces the friction of the cable pull means for a movement inside the cable pull envelope/within the liner and thus ensures high durability and protection against environmental influences, in particular against dirt and moisture. Furthermore due to the coating as well as an encapsulated cable pull envelope an advantage is created over conventional plated and stainless steel cable pulls based on the reduced friction and the additional protection against moisture. The cable pull system is realised in such a way that at least the encapsulated cable pull envelope with a stop sleeve extends all the way from the drive to a housing of the image capturing system, so that inside the housing of the image capturing system, there is only the flexible cable pull means with a slippery coating extending along the deflecting element. This arrangement ensures maximum flexibility of the cable pull means within the housing of the image capturing system, so that depending on the bending radius, force transfer along the deflecting element is optimal.

Ideally the deflecting element or the deflecting roller comprises a minimum radius (guiding radius measured from the rotational axis up to the where the cable pull means contacts the deflecting roller) of 3-times to 30-times, in particular 5-times to 20-times, especially preferably from 8-times to 15-times that of the cross-section thickness of the transfer element, in particular the cable pull means (without cable pull envelope) in order to achieve low-friction and wear-resistant force transfer.

Furthermore it is feasible that the camera unit, in particular the camera carriage, can be brought into a maintenance position which does not correspond to the open position and/or the closed position. A maintenance position makes access to the camera unit easier so that if repairs or cleaning is required, access is only possible to the camera unit without having to remove the complete image capturing system from the vehicle. Accordingly it is also feasible for the camera unit, if it is defective, to be simply replaced, or for dirt or other foreign bodies to be removed from the camera unit/the at least one camera lens.

Furthermore it is advantageous if the protective element is configured as a one-piece or multi-piece shutter for an opening region of the image capturing system, in particular the camera carriage, wherein in particular the protective element can be configured as a bladed shutter or a central shutter or a roller shutter or diaphragm shutter. A one-piece protective element has the advantage that this can be manufactured in a cost-effective and simple manner, for example by injection moulding from plastic or metal. A multi-piece protective element, on the other hand, has the advantage that this can be configured more flexibly by linking several parts together in an articulated manner so that these are movable along a bend or edge, for example. Accordingly the parts of the protective element can be arranged inside the housing or the vehicle body in the open position.

An image capturing system according to the invention can be further developed such that a cleaning system can be arranged on the image capturing system which is movable via the transfer element. The cleaning system allows the camera/the camera lens to be cleaned of dirt and other foreign bodies so that the viewing path for image capture of the outside area is unobstructed. This increases the functional reliability of the image capturing system and permits its use even in bad weather. In this context it is also feasible for the cleaning system to be used for applying care products or frost-insensitive products for cleaning the camera unit. The use of anti-misting agents for the camera lens is also feasible.

According to the invention moreover, it is feasible that the mechanism with the deflecting element is used not only for moving the protective element, but also the camera carriage and the cleaning system. To this end the mechanism can be equipped with a plurality of transfer and deflecting elements so that, for a compact construction, the movement of the protective element, the camera carriage and the cleaning system can be realised.

In terms of the invention the open position and/or the closed position and/or the maintenance position can be locked by an end position switch and/or a mechanical stop. Thus a defect of the camera unit, in particular of the connections and cables as well as the drive can be avoided. The connections and cables within the image capturing system are thus prevented from being wedged-in, thereby preventing breakages and/or cracks as much as possible. Moreover, the drive can be switched off on reaching the end position switch and/or the mechanical stop, so that unnecessary loads which could lead to the drive becoming defective are prevented. Furthermore a signal can be transmitted via an end position switch according to the invention, whereby the camera unit can be locked in its position and this fact be communicated to a corresponding indicating means where the signal is evaluated with the position being indicated.

Furthermore it is feasible for a second transfer element to be arranged on the camera unit and/or the camera carriage and/or the protective element and/or the cleaning system, allowing a driving force to be transferred into a second movement direction. This is a way of realising that based on a further drive or the drive already known, a driving force can also be moved into the reverse direction, for both directions of movement, i.e. from the inactive position into the recording position or from the open into the closed position or a maintenance position.

In terms of the invention the camera unit and/or the camera carriage and/or the protective element and/or the cleaning system may be spring-loaded. This makes it possible that for a cable pull device, which allows a transfer of force in one direction only, the reverse direction of movement can be realised by a spring-loaded fastening. Thus a further drive which would have to implement the respective reverse direction can be omitted. This allows the installation space to be further reduced, thereby, at the same time, increasing failure safety because this is a purely mechanical connection which is not dependent on a further drive. Moreover this embodiment is very cost-effective.

Furthermore it is feasible that the camera unit and/or the camera carriage and/or the protective element and/or the cleaning system can be moved into the open position and/or the closed position and/or the maintenance position by an energy store. According to the invention it is feasible, in particular, that this is an energy store which temporarily stores the kinetic energy and releases it again upon request for a respective movement. Here again, a further drive for transferring the force against the pulling direction can be omitted thereby reducing the installation space and the manufacturing cost even further.

Advantageously the drive may be self-locking so that the drive does not have to be energised in order to maintain a stationary position. In this way the required energy for the drive can be minimised on the one hand and on the other, a desired position can be maintained due to a simple mechanical construction. This allows the self-locking effect to be influenced by e.g. a corresponding angle of inclination, a corresponding surface roughness of the support surface, the material pairing, the gliding speed, a suitable lubricant or heating. Preferably gears may be used, for which the effect is achieved by a high transmission and by inertia moments/ low efficiency levels. Preferably these gears are worm gears which meet the necessary requirements if the angle of incline is smaller than the effective angle of the friction cone.

Further measures improving the invention are revealed in the description below of a few embodiments, which are schematically shown in the drawings. All features and/or advantages including constructional details, spatial arrangements and method steps may be essential to the invention both on their own as well as in various combinations. In the drawing

DETAILED DESCRIPTION

Figure 1A:
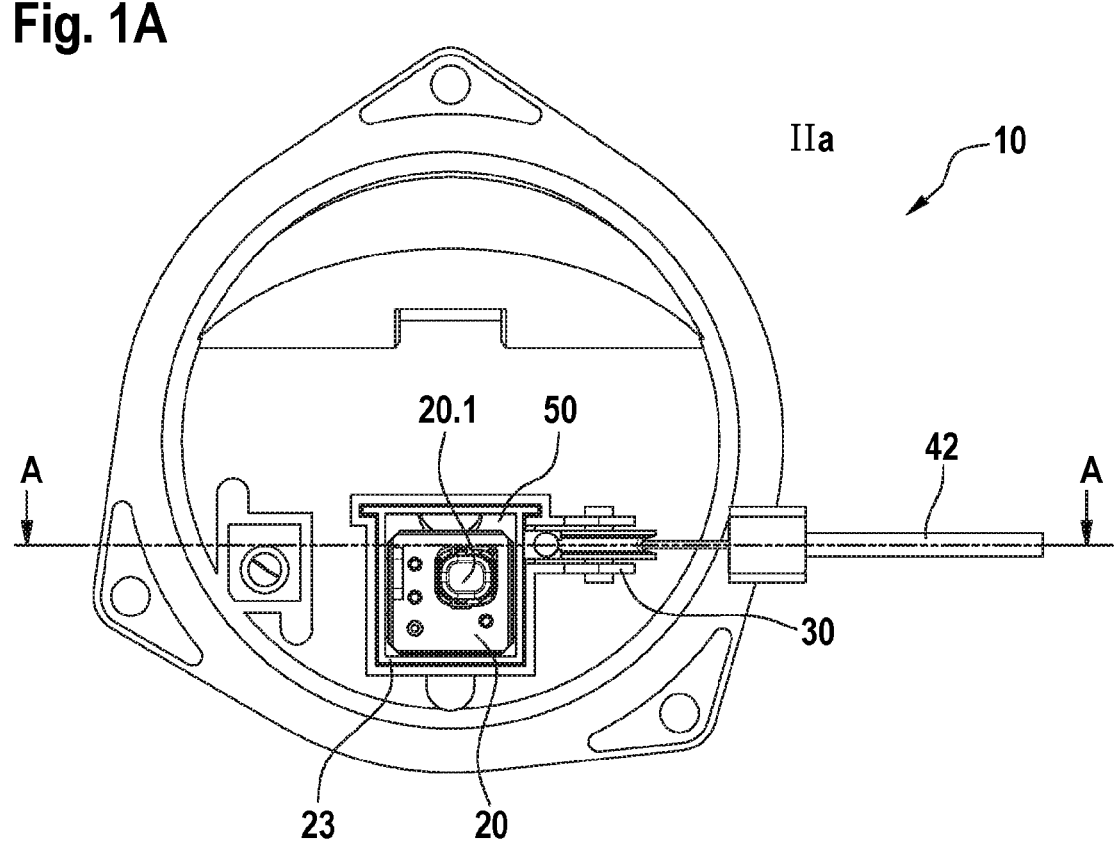
FIG. 1A schematically shows the image capturing system in a front view.

Elements having the same function and mode of operation are marked with the same reference symbols in FIGS. 1A to 3B.

FIG. 1 shows an image capturing system according to the invention in open position IIa with a camera unit 20 comprising a lens 20.1. The camera unit 20 is arranged in a camera carriage 23 in such a way that the lens 20.1, through the opening region 50, can capture an outside area of a motor vehicle. In addition the deflecting element 30 of the mechanism 22 which is in operative connection with the camera carriage 23, can be recognised, so that this mechanism, in order to change the direction of a force applied to the deflecting element 30/the mechanism 22 from a drive 60 (see FIG. 3B), serves to move the camera unit 20/the camera carriage 23. FIG. 1 shows the image capturing system 10 (without drive 60) in a front view.

Figure 1B:
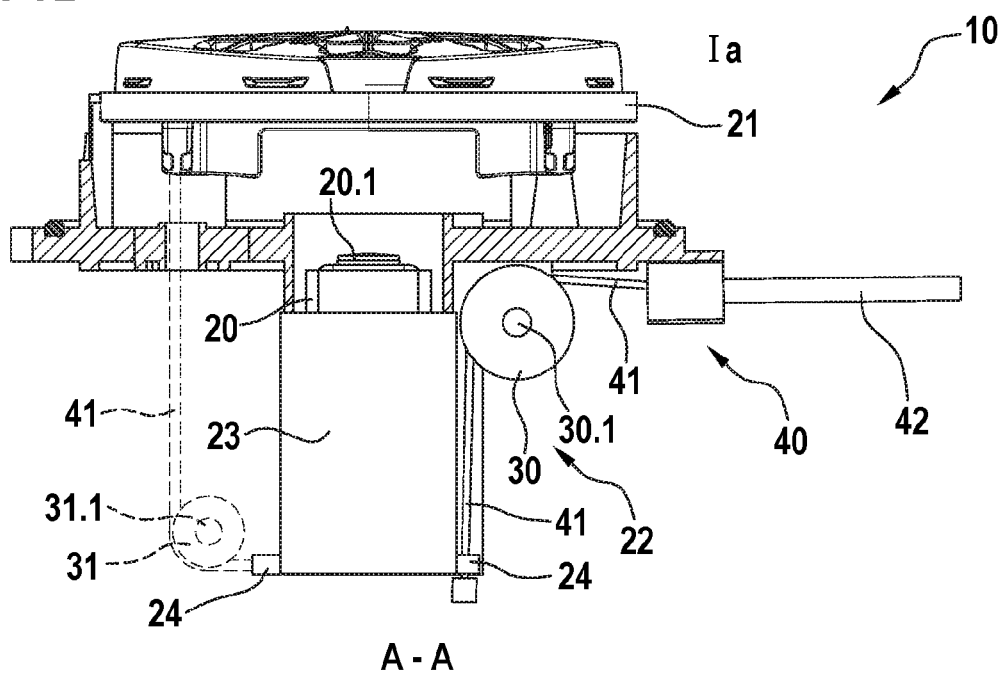
FIG. 1B schematically shows the image capturing system in the closed position Ia, FIG. 1C schematically shows the image capturing system in the closed position Ia, FIG. 2A schematically shows the image capturing system in the maintenance position IIIa, FIG. 2B schematically shows the image capturing system in the maintenance position IIIa, FIG. 3A schematically shows the image capturing system in the open position IIa, FIG. 3B schematically shows the image capturing system in the open position IIa.

FIG. 1B shows the image capturing system 10 with a camera unit 20 in the closed position Ia, wherein the lens 20.1 is located behind the protective element 21 and is thus inaccessible from outside. Furthermore the mechanism 22 can be seen, wherein the deflecting element 30 is configured as a deflecting roller 30 with a rotational axis 30.1 and is in operative connection with the cable pull means 41 as the transfer element 40. The cable pull means 41 of the transfer element 40 is redirected by the deflecting roller 30 and is attached to the connecting element 24 of the camera carriage 23. The cable pull means 41 attached at one end to the connecting element 24 is guided with its other end through the encapsulated cable pull envelope 42 which is supported against the image capturing system 10 by the stop sleeve 43. In addition the camera carriage 23 comprises a further stop element 24, on which, in FIG. 1B, a second deflecting roller 31 is shown as a broken line with a second rotational axis 31.1. The second deflecting roller 31 is arranged in such a way that, when the camera carriage 23 moves from the closed position Ia into the open position IIa via the cable pull means 41, the protective element 21 is moved from the closed position Ia into the open position IIa. Accordingly, for an introduction of force via the cable pull means 41/the deflecting element 30, for a simultaneous movement of the camera carriage 23 into the open position, the protective element 21 can be moved by the second cable pull means 41 and the second deflecting roller 31 into the open position IIa.

The deflecting element 30 or the deflecting roller 30 comprises a minimum radius (guiding radius measured from the rotational axis 30.1 up to the where the cable pull means contacts the deflecting element 30 or the deflecting roller) of 3-times to 30-times, in particular 5-times to 20-times, especially preferably from 8-times to 15-times that of the cross-section thickness of the transfer element 40, in particular the cable pull means 41 (without cable pull envelope 42) in order to achieve a low-friction and wear-resistant transfer of force.

Figure 1C:
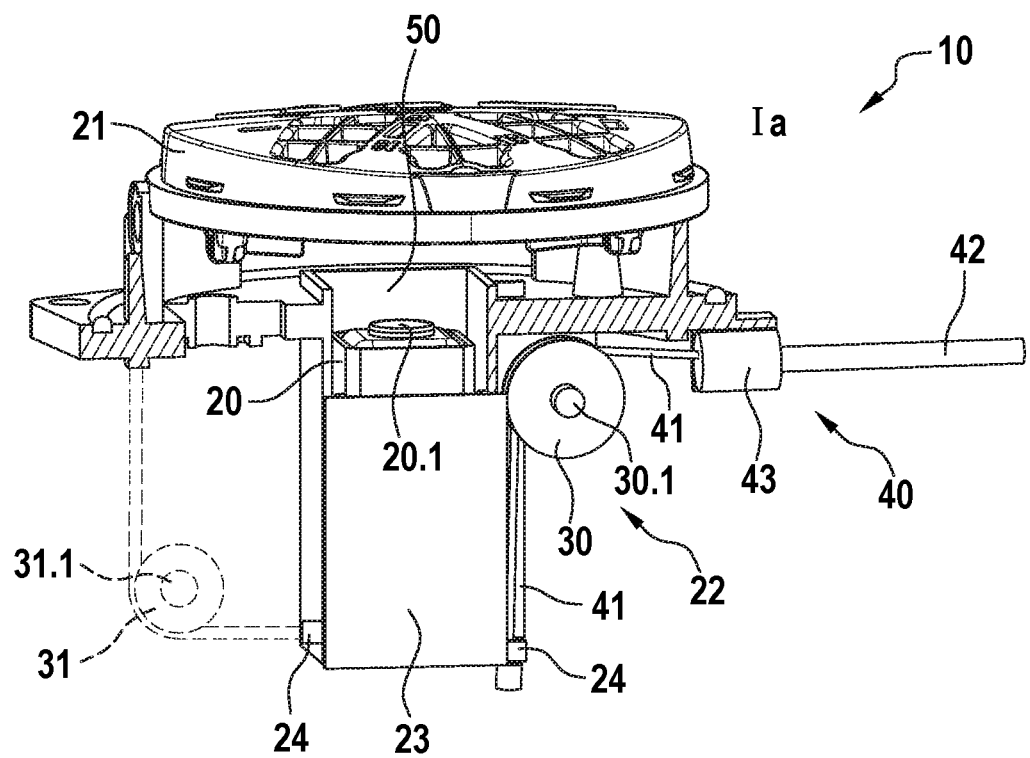

FIG. 1C shows, as does FIG. 1B, the image capturing system 10 according to the invention in the closed position Ia, in which the camera unit 20 with the lens 20.1 is arranged behind the protective element 21. It can be seen in FIG. 1C, how the protective element 21 covers the opening region 50 of lens 20.1, so that the lens 20.1/the camera unit 20 is protected against environmental influences. Moreover the mechanism 22 with deflecting roller 30 and a second deflecting roller 31 with respective axes 30.1 and 31.1 can be recognised. In FIG. 1C also, analogously to FIG. 1B, an introduction of force causes the camera unit 20 as well as the protective element 21 to be moved via the transfer element 40 from a closed position into an open position.

Figure 2A:
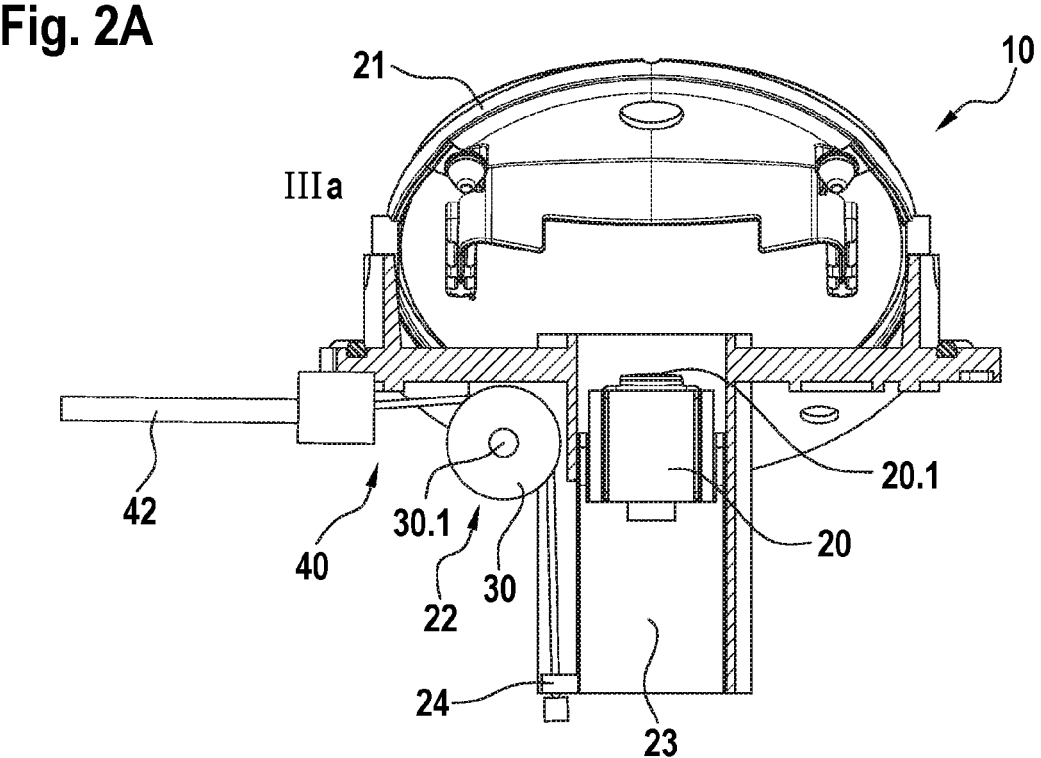

FIG. 2A shows the image capturing system 10 in the maintenance position IIIa, which does not correspond to the open position IIa nor to the closed position Ia. The maintenance position IIIa makes access to the camera unit 20/the lens 20.1 easy, thereby making access easier when repairs or cleaning operations are required. In the maintenance position IIIa the camera carriage 23 is located remotely from the opening region 50. In this position it is also feasible that the camera unit 20 can be moved manually out of the camera carriage 23 in order to carry out maintenance or repair work without having to move the camera carriage 23 completely into the open position Ia.

Figure 2B:
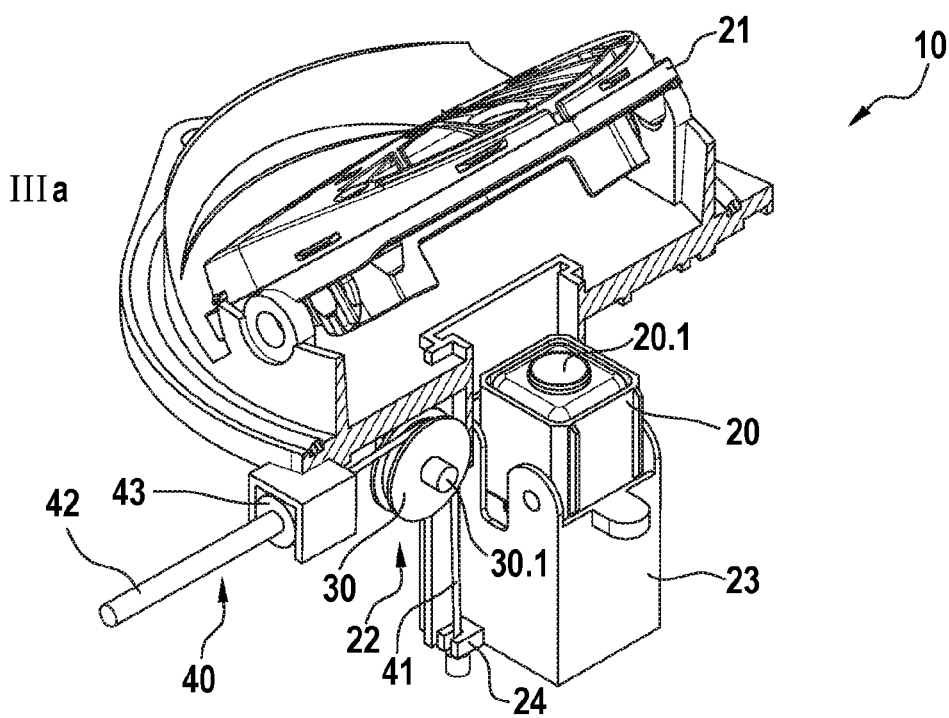

FIG. 2B shows the image capturing system 10 in maintenance position IIIa, wherein it can be recognised that the camera unit 20 has, to a large extent, been moved out of the camera carriage 23, wherein the camera carriage 23 is in its closed position. As a result access to the camera unit 20/the lens 20.1 is easy, allowing the camera unit 20 to be replaced or the lens 20.1 to be cleaned. In FIG. 2B the one-piece protective element 21 can be seen swivelled into the open position about a rotational axis, wherein the part of the protective element 21 above the swivel axis is swivelled into a housing of the image capturing system 10, so that at the same time the part of the protective element 21 below the swivel axis is swivelled out of the housing of the image capturing system 10. The transfer means 40 configured here as a flexible cable pull system 40 comprises an encapsulated cable pull envelope 42, a flexible cable pull element 41 as well as a stop sleeve 43. The stop sleeve 43 here is also arranged in a receptacle in a housing so as to be mostly encapsulated against environmental influences. The flexible cable pull means 41 extends through the encapsulated cable pull envelope 42 and the stop sleeve 43, and is thus protected against environmental influences by the cable pull envelope 42, and does not leave the cable pull envelope 42 until it has reached the inside of the housing of the image capturing system.

Figure 3A:
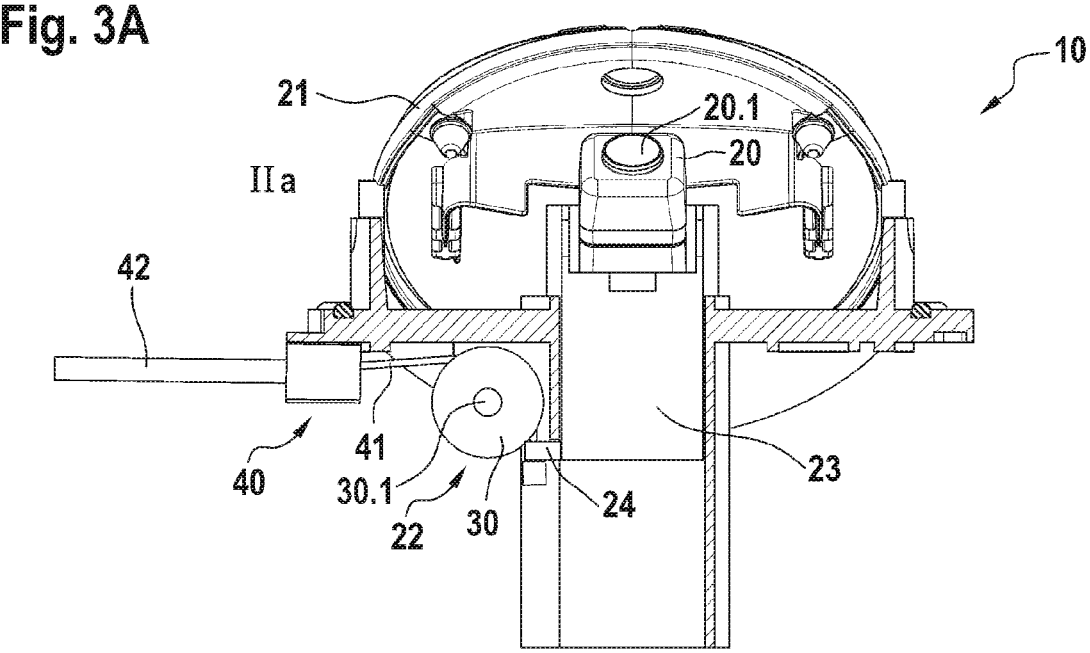

FIG. 3A shows the image capturing system 10 in the open position IIa, in which the circularly-shaped protective element 21 exposes the camera unit 20/the lens 20.1 for image capture. The camera carriage 23 is in an open position IIa, in which it is moved out of its receptacle, and in which the camera unit 20/the lens 20.1 also protrudes from the camera carriage 23 and thus from the image capturing system 10. As can be recognised on the mechanism 22, the connecting element 24 of the camera carriage 23 is now in the vicinity of the deflecting element 30, so that it is obvious that the camera carriage is now in an open position, and a pulling force is applied to the cable pull means 41 by a drive 60 such that a large part of the cable pull means 41 is now outside the image capturing system 10.

Figure 3B:
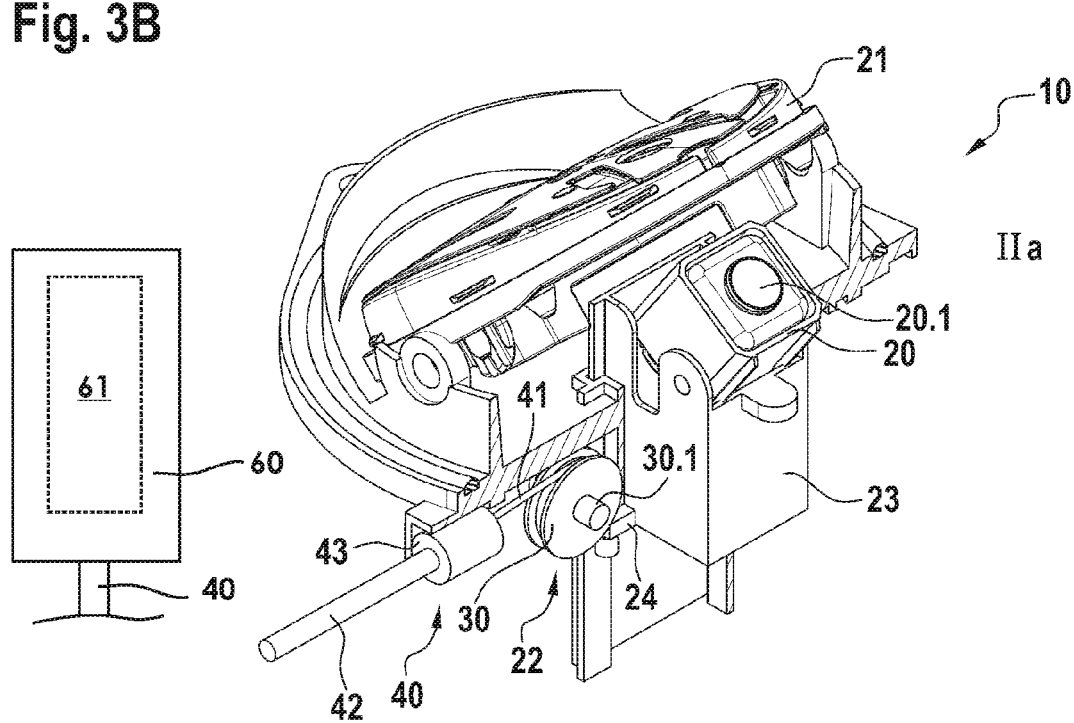

FIG. 3B also shows the image capturing system 10 in the open position IIa, wherein it can be recognised how the protective element 21 is swivelled into the open position and the camera unit 20/the lens 20.1 is exposed for capturing images of the outside area. It can also be recognised, how the camera unit 20 is swivelled out of the camera carriage 23 about a fulcrum, thereby resulting in a suitable image capturing area.

In addition FIG. 3B also schematically shows the drive 60 with a motor 61. From the drive 60 the flexible cable pull means 40 goes to the deflecting element 30 in order to actuate the mechanism 22, among others. In order to change the torque of the motor 61, the drive 60 may comprise a self-locking element possibly in the form of a gear.

LIST OF REFERENCE SYMBOLS 10 image capturing system
20 camera unit
21 protective element
22 mechanism
23 camera carriage
30 deflecting element
30.1 rotational axis
31 deflecting element
31.1 rotational axis
40 transfer element
41 cable pull means
42 cable pull envelope
43 stop sleeve
50 opening area
60 drive
61 motor, possibly with self-locking element
Ia closed position
IIa open position
IIIa maintenance position

The invention claimed is:

1. An image capturing system comprising a camera unit for capturing images of the outside area of a motor vehicle, and
- a protective element, at least the camera unit and/or the protective element can be moved via a drive from a closed position (Ia) into an open position (IIa), wherein
- in the closed position (Ia) of the protective element at least a lens of the camera unit is located behind the protective element so as to be inaccessible from outside, and
- in the open position (IIa) at least the lens of the camera unit is exposed for image capture by the protective element, wherein
- at least one deflecting element in operative connection with at least one transfer element which serves to change the direction of a force applied, thereby realizing a compact installation space, wherein the at least one transfer element is attached with a first end to a connecting element of a camera carriage of the camera unit or the protective element and a second end of the transfer element is attached to the drive, wherein the transfer element is a flexible cable pull system.

2. The image capturing system according to claim 1, wherein
the deflecting element is a deflecting roller, the deflecting roller is movably mounted.

3. The image capturing system according to claim 2 wherein the deflecting roller is rotatable about a rotational axis.

4. The image capturing system according to claim 2 wherein the protective element is a bladed shutter, a central shutter, a roller shutter or a diaphragm shutter.

5. The image capturing system according to claim 1, wherein
the camera unit is steplessly movable via the camera carriage between the open position (IIa) and the closed position (Ia).

6. The image capturing system according to claim 1, wherein
the flexible cable pull system is a sealed cable pull system, which comprises at least one encapsulated cable pull envelope, at least one flexible cable pull means, at least one stop sleeve and at least one liner in which the flexible cable pull means can be arranged.

7. The image capturing system according to claim wherein the at least one flexible cable pull means has a slippery coating.

8. The image capturing system according to claim 1, wherein
the camera carriage, can be brought into a maintenance position (IIIa) which does not correspond to the open position (IIa) and/or the closed position (Ia).

9. The image capturing system according to claim 1, wherein
a cleaning system can be arranged on the image capturing system, which can be driven by a transfer element.

10. The image capturing system according to claim 1, wherein
the protective element is realized as a one-piece or multi-piece shutter for an opening area of the camera carriage.

11. The image capturing system according to claim 10, wherein
the camera unit and/or the camera carriage and/or the protective element and/or the cleaning system are spring-loaded by return springs.

12. The image capturing system according to claim 10, wherein
the camera unit and/or the camera carriage and/or the protective element and/or the cleaning system can be brought into the open position (IIa) and/or the closed position (Ia) and/or the maintenance position (IIIa) by an energy store.

13. The image capturing system according to claim 10, wherein
the protective element, the camera carriage and the cleaning system can each be provided with the deflecting element.

14. The image capturing system according to claim 1, wherein
the drive serves to move not only the protective element, but also the camera carriage and the cleaning system.

15. The image capturing system according to claim 1, wherein
the open position (IIa) and/or the closed position (Ia) and/or the maintenance position (IIIa, IIIb) can be locked by an end position switch and/or a mechanical stop.

16. The image capturing system according to claim 1, wherein
a second transfer element can be arranged on the camera carriage and/or the protective element and/or the cleaning system, thereby allowing, in particular, a force to be transferred into a second direction of movement.

17. The image capturing system according to claim 1, wherein
the drive can comprise a self-locking element, so that the drive does not have to be energized in order to maintain a stationary position.

* * * * *